Patented Oct. 24, 1933

1,931,515

UNITED STATES PATENT OFFICE 1,931,515

PROCESS FOR THE MANUFACTURE OF ALUMINA

Heinrich Specketer, Fritz Rossteutscher, and Konrad Rosenberger, Griesheim-on-the-Main, Germany, assignors to the firm I. G. Farbenindustrie Aktiengesellschaft, Frankfort-on-the-Main, Germany.

No Drawing. Application July 21, 1927, Serial No. 207,562, and in Germany August 21, 1926

4 Claims. (Cl. 23—141)

This invention relates to the production of valuable aluminium compounds. Its chief object is to produce alumina or soluble compounds of alumina from clay, phonolithe, leucite, or similar raw materials, which object may be combined with the simultaneous obtainment of hydrochloric acid and alkali metal compounds.

When employing clay the process forming the object of the invention is carried out in the following manner. The clay is dissolved in sulfuric acid and the solution separated from the residue which consists mainly of silicic acid and undissolved clay. Into the solution thus obtained a quantity of sodium chloride nearly approximating in equivalents the amount of the sulfuric acid is introduced whereupon this mixture is evaporated and heated to about 700° C. to effect a decomposition according to the following equation:

(1) $Al_2(Fe_2)(SO_4)_3 + 3H_2O + 6NaCl =$
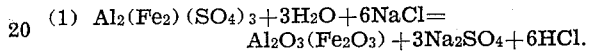
$Al_2O_3(Fe_2O_3) + 3Na_2SO_4 + 6HCl$.

In this case it has been ascertained that the best results are obtainable by effecting the heating and decomposition whilst passing the heating gases and the material to be treated in the same direction through the furnace, for instance, a rotary tubular furnace.

In order to obtain a sulfate the sintered product may be extracted with water and the alumina may be separated from the mixture of alumina and ferric oxide in the well-known manner, for instance, by the Bayer process.

When the obtainment of sodium sulfide or sodium carbonate besides alumina is aimed at the corresponding quantity of reducing carbon is added to the sintered product and the mixture is heated to about 1000° C., preferably in a rotary tubular furnace. The alumina forms an aluminate with one part of the sulfate whereas the remaining part is converted to sodium sulfide containing more or less sodium carbonate. The molten mass is lixiviated and separated from the excess of carbon and other residues.

Furthermore it has been found that it is possible to recover, with the same amount of alkali metal salt, three times as much alumina as when following the above-mentioned process by proceeding in the following manner:—At first alumina or aluminous materials are dissolved partly in hydrochloric and partly in sulfuric acid or in a mixture of both. Preferably the acids are taken in such proportions that one part of alumina is dissolved in sulfuric and two parts in hydrochloric acid. When starting, for instance, from clay and employing a mixture of sulfuric and hydrochloric acids the reaction takes place according to the following equation:—

(2) $3(Al(Fe)_2O_3.2SiO_2.2H_2O) + 3H_2SO_4 + 12HCl =$
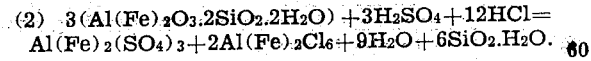
$Al(Fe)_2(SO_4)_3 + 2Al(Fe)_2Cl_6 + 9H_2O + 6SiO_2.H_2O$.

The solution is filtered to remove the silicic acid, mixed with a quantity of sodium chloride corresponding to the amount of sulfuric acid and evaporated. Hereupon the residue is heated to 600–800° C. preferably in a direct current, the following reaction taking place:—

(3) $Al(Fe)_2(SO_4)_3 + 2Al(Fe)_2Cl_6 + 6NaCl + 9H_2O =$
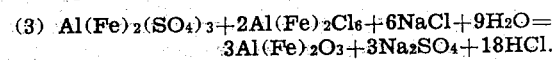
$3Al(Fe)_2O_3 + 3Na_2SO_4 + 18HCl$.

The mixture of alumina (ferric oxide) and sulfate is hereupon heated in the well-known manner by preference to 900–1100° C. with the addition of coal to form an aluminate. The melt is dissolved, the solution filtered off from the undissolved ferric oxide, and the alumina stirred out or precipitated by means of carbon dioxide or sulfuretted hydrogen respectively. From the sodium carbonate solution either sodium carbonate or, after causticizing with lime, caustic soda may be recovered.

The process is not rigorously confined to the conditons explaned above. For instance, the extraction of the clay may be conducted in such a way that the extract becomes basic the advantage of which being that more alumina is dissolved than corresponds to the amount of acid employed. Furthermore the proportions of hydrochloric acid, sulfuric acid and alkali metal chloride may be varied and the latter may be replaced by the corresponding amount of an alkali metal sulfate. Furthermore the alumina resulting from the decomposition of the alumina chloride (see Equation No. 3 above) which is to be converted to aluminate by reaction with sulfate and carbon may be introduced partly or entirely in the form of bauxite or the like compounds.

The process forming the object of the present invention affords the important technical and economical advantage that besides alumina hydrochloric acid and highly valuable alkali compounds are recovered from cheap raw materials in simple apparatus and with slight outlays for wages and combustibles.

We claim:—

1. In the process of producing aluminium compounds, the steps which comprise adding to an aluminium salt solution containing a quantity of aluminium chloride and a quantity of aluminium sulfate an alkali metal chloride and an alkali metal sulfate, said alkali compounds being incorporated in said solution in such quantities as to produce an aqueous salt mixture corresponding approximately to the formula $$Al(Fe)_2(SO_4)_3 + 2Al(Fe)_2Cl_6 + 6MeCl$$

wherein Me represents alkali, evaporating the product to dryness and heating it to from about 600° to 800° C. by means of a current of direct heating gases moving in the same direction as the said product, until the hydrochloric acid is expelled, mixing the resulting sintered product with coal, heating the mixture to from about 800° to 1100° C. and separating the aluminate so formed.

2. In the process of producing aluminium compounds, the steps which comprise dissolving a raw material containing a silicate of alumina in sulphuric acid and hydrochloric acid and removing the undissolved matter, adding to the solution an alkali metal chloride and an alkali metal sulfate, said alkali compounds being incorporated in said solution in such quantities as to produce an aqueous salt mixture corresponding substantially to the formula $$Al(Fe)_2(SO_4)_3 + 2Al(Fe)_2Cl_6 + 6MeCl$$

wherein Me represents alkali, evaporating the product to dryness and heating it to from about 600° to 800° C. by means of a current of direct heating gases moving in the same direction as the said product, until the hydrochloric acid is expelled, mixing the resulting sintered product with coal, heating the mixture to from about 800° to 1100° C. and separating the aluminate so formed.

3. In the process of producing aluminium compounds, the steps which comprise dissolving a raw material containing a silicate of alumina in sulphuric acid and hydrochloric acid so as to produce an aqueous salt mixture corresponding substantially to the formula $$Al(Fe)_2(SO_4)_3 + 2Al(Fe)_2Cl_6$$

and removing the undissolved matter, adding to the solution an alkali metal chloride in a quantity approximately equivalent to the sulfate present, evaporating the product to dryness and heating it to from about 600° to 800° C. by means of a current of direct heating gases moving in the same direction as the said product, until the hydrochloric acid is expelled, mixing the resulting sintered product with coal, heating the mixture to from about 800° to 1100° C. and separating the aluminate so formed.

4. In the process of producing aluminium compounds, the steps which comprise dissolving a quantity of a raw material containing a silicate of alumina in sulphuric acid and another quantity of a similar raw material in hydrochloric acid so as to produce an aqueous salt mixture corresponding substantially to the formula $$Al(Fe)_2(SO_4)_3 + 2Al(Fe)_2Cl_6$$

and removing the undissolved matter, adding an alkali metal chloride to said combined solutions in a quantity approximately equivalent to the sulfate present, evaporating the product to dryness and heating it to from about 600° to 800° C. by means of a current of direct heating gases moving in the same direction as the said product, until the hydrochloric acid is expelled, mixing the resulting sintered product with coal, heating the mixture to from about 800° to 1100° C. and separating the aluminate so formed.

HEINRICH SPECKETER.
FRITZ ROSSTEUTSCHER.
KONRAD ROSENBERGER.